(12) United States Patent
Bode et al.

(10) Patent No.: US 6,313,940 B1
(45) Date of Patent: Nov. 6, 2001

(54) SYSTEM BASED CONTROL OF OPTICAL AMPLIFIER TRANSMISSION FUNCTIONS

(75) Inventors: Dirk Bode, Tinton Falls; Victor S. Hyun, Holmdel; John G. Israel, Fair Haven; Gerard T. Lingner, III, Long Branch; Bradley A. McKay, Fair Haven; Prasanna R. Nadhumi, Matawan; William A. Thompson, Red Bank, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/476,595

(22) Filed: Dec. 31, 1999

(51) Int. Cl.$^7$ ........................................................ H01S 3/00
(52) U.S. Cl. ............................................ 359/337; 359/177
(58) Field of Search .................................... 359/177, 110, 359/337

(56) References Cited

U.S. PATENT DOCUMENTS 5,440,418 * 8/1995 Ishimura et al. ..................... 359/177
6,023,366 * 2/2000 Kinoshita et al. .................... 359/341
6,151,148 * 11/2000 Harano ................................ 359/174

* cited by examiner

Primary Examiner—Mark Hellner
(74) Attorney, Agent, or Firm—Steve Mendelsohn

(57) ABSTRACT

Each of a series of optical amplifiers is arranged such that, in response to detecting particular stimuli occurring at an input or receipt of an adjustment start message from an upstream amplifier, adjusts certain amplifier parameters using small steps and completes the adjustment using large steps if it does not receive the adjustment start message within a predetermined period of time of starting the adjustment in response to detecting the stimuli. If the optical amplifier receives the adjustment start message, then it continues to perform the adjustment and completes the adjustment using large steps when it receives an adjustment done message from the upstream optical amplifier. At that point, the optical amplifier sends an adjustment done message to the next downstream amplifier if it is not the tail-end amplifier.

31 Claims, 4 Drawing Sheets

SYSTEM BASED CONTROL OF OPTICAL AMPLIFIER TRANSMISSION FUNCTIONS

FIELD OF THE INVENTION

The invention relates to optical transmission systems and more particularly relates to optical transmission amplifiers.

BACKGROUND OF THE INVENTION

An optical amplifier may be arranged to perform a particular system/amplifier function in response to a change in particular stimuli. For example, an optical amplifier may be arranged to change the level of its optical pump power in response to a change in the power level of an incoming optical signal, which may be due to a change in the number of optical channels carried by the incoming signal or due to a change in span loss.

A change in an incoming optical signal may also be due to an optical fiber nonlinearity. One such nonlinearity is commonly referred to as Raman gain. The Raman gain, or effect, becomes particularly troublesome when an appreciable level of optical power distributed over a certain range of wavelengths is pumped into an optical fiber. In that instance, the Raman gain is tilted in favor of the channels having the longer wavelengths, which degrades the Signal-to-Noise Ratio (SNR) of the signals in the lower wavelength channels and thus seriously degrades their performance. Moreover, the power levels of higher wavelength channels may increase, thereby making those channels more susceptible to non-linearity problems. Raman gain may be dealt with at an amplifier by "tilting" the outputted optical signal in a direction opposite to the Raman gain, as disclosed in copending U.S. patent application of Ser. No. 09/265,943 filed Mar. 8, 1999, which is hereby incorporated by reference.

A problem arises when a downstream optical amplifier in an optical transmission system having a plurality of optical amplifiers disposed along the optical transmission path responds independently in the described manner to a change in the power level of an incoming optical signal. More specifically, a downstream optical amplifier may tilt its output signal in the wrong direction, or exaggerate the tilt, if it performs its tilt adjustment before an upstream optical amplifier has completed its tilt adjustment. Also, the optical transmission system may not stabilize with respect to a change in the input signal, or a change in some other nonlinearity, if each optical amplifier in the transmission path is allowed to proceed independently.

SUMMARY OF THE INVENTION

The foregoing problem is dealt with by arranging an optical amplifier such that, in response to detecting particular stimuli occurring at an input or receipt of an adjustment start message from an upstream amplifier, it starts the aforementioned adjustments slowly using small incremental steps and sends an adjustment start message over the optical transmission media to a next downstream amplifier. The amplifier will complete the adjustment using small steps if it does not receive an adjustment done message from an upstream optical amplifier within a predetermined period of time of starting the adjustment in response to detecting the stimuli. If the optical amplifier receives an adjustment start message, then it continues to perform the adjustment and quickly completes the adjustment using large steps when it receives an adjustment done message from the upstream optical amplifier. At that point, the optical amplifier sends an adjustment done message to the next downstream amplifier if it is not the tail-end amplifier.

As an aspect of the invention, the head-end optical amplifier performs the adjustments using only large steps. As another aspect of the invention, the head-end optical amplifier periodically initiates the adjustments even if it does not detect such stimuli.

These and other aspects of the invention will be appreciated from the following detailed description taken in conjunction with the accompanying drawings.

BRIEF DESCRIPTION OF THE DRAWING In the drawings.

DETAILED DESCRIPTION

Figures 1, 3:
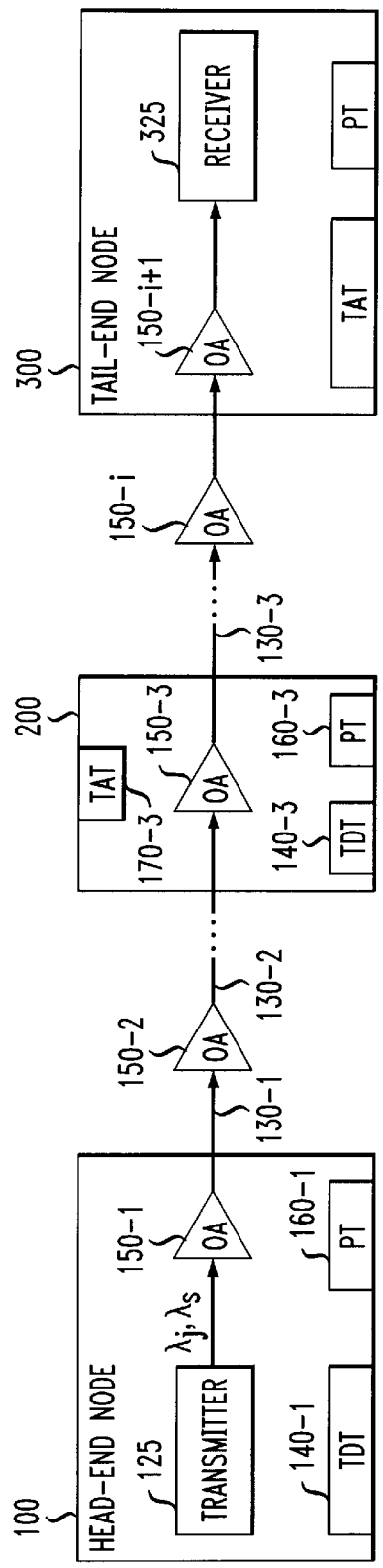
FIG. 1 is a broad block diagram of an optical transmission system in which the principles of the invention may be practiced.
FIG. 3 is an illustrative example of a transmit-channel power map which identifies the relative power levels between optical channels within the system of FIG. 1.

An illustrative optical transmission system embodying the principles of the invention is shown in simplified form in FIG. 1. The optical system, more particularly, includes head-end node 100 having inter alia, a plurality of laser transmitters and a multiplexer within transmitter 125. Head-end node 100, as well as the other nodes; illustratively nodes 200 and 300, includes a number of different timers including a so-called periodic timer (PT) tilt adjustment timer (TAT) and tilt done timer (TDT) as will be discussed below in detail. Each of the nodes, e.g., node 100, includes a group of optical amplifiers in which a pair of the optical amplifiers respectively serves east and west paths of a respective transport connection as shown below. (For the sake of clarity and simplicity, only one optical amplifier is shown per node for an east bound path 130 of a particular transport connection, in which each of the optical amplifiers is associated with an optical node, as is shown for optical amplifier 150-3 and thus operate similarly. It is to be understood that is not to be taken as a limitation since the principles of the invention equally applies to the west bound path of the transport connection, and similarly applies to other transport connections within a node.)

Continuing, head-end node 100 is connected to tail-end node 300 via a plurality of optical amplifiers 150-1 through 150-i disposed along optical transmission path segments 130i. Tail-end node 300 includes, inter alia, a demultiplexer and a plurality of optical receivers within receiver 325. Each of the transmitters outputs a respective information bearing optical signal having a unique wavelength, $\lambda_j$. It is assumed herein that a particular optical signal is destined for one of the receivers served by tail-end node 300. For the present discussion, it is assumed that the optical transmission system has N optical channels, where N>1, in which one of the optical channels, $\lambda_s$, serves as a system signaling channel. The optical channels are respectively associated with respective ones of the transmitters and are identified by their respective wavelengths, $\lambda_1, \lambda_2, \lambda_3, \ldots \lambda_N$, which are sufficiently separated from one another to prevent signals in adjacent channels from interfering with one another. Such separation may be, for example, 300 GHz or less. Head-end node 100 combines (multiplexes) the transmitter signals and then outputs them to optical transmission line 130 via head-end optical amplifier 150-1. The combined optical signal is then transported via amplifiers 150-2 through 150-i and optical path segments 130i to tail-end node 300. Tail-end node 300 separates the combined signals from one another and supplies the separated signals to respective ones of the receivers (not shown).

As mentioned, if a downstream optical amplifier, e.g., amplifier 150-3, responds independently to a change in the power level of an incoming optical signal, then it may tilt its output signal in the wrong direction, or exaggerate the tilt. Also, the optical transmission system may not stabilize with respect to a change in the input signal, or a change in some other system parameter, if each optical amplifier in the transmission path is allowed to proceed independently.

We deal with this problem by arranging each such optical amplifier so that it does not operate independently of the upstream amplifier(s), but begins to adjust its pump power and the tilt of its output signal using small steps until the next upstream amplifier notifies it within a predetermined period of time that the upstream adjustments have been completed. At that point, the downstream amplifier uses larger steps to speed up the adjustments. Also, if an upstream amplifier, e.g., amplifier 150-1, detects a change in the power level of the incoming signal or some other stimuli, then it sends a Tilt Start Message (TSM) to the next downstream amplifier 150-2 via the signaling channel, and initiates such adjustments using large steps if it is the head-end amplifier. Such adjustments are made in the manner disclosed in the aforementioned copending patent application.

Briefly, the optical amplifier supplies a portion of the optical signal that it outputs to the respective path segment 130i to an optical spectrum analyzer (monitor), preferably the optical spectrum analyzer known by the Comcode 300899540 available from Lucent Technologies Inc. The optical analyzer/monitor (not shown in the FIG.) analyzes the spectrum of the optical signal that it receives and determines the wavelengths and power levels of the component optical signals forming the received signal. The optical monitor then supplies the results of its determination to a controller within the amplifier. The controller dynamically increases or decreases the level of attenuation that is applied to an optical signal that is supplied to an erbium-doped fiber. The controller continues to adjust the attenuator until the desired pre-emphasis of the outputted optical signal is achieved. The controller also adjusts, in a conventional manner, the level of the optical pump power that is applied to the incoming optical signal.

(Note that the above-mentioned change may also be caused by a change in the number of channels carried by the incoming signal, a change in the transmission path loss, a degradation in an optical amplifier in the transmission path, etc.)

Continuing, each of the downstream optical amplifiers sends the TSM in the signaling channel, $\lambda_s$, to the next downstream amplifier. A downstream optical amplifier, e.g., amplifier 150-4, which does not detect the change and, therefore, has not started its adjustments, will do so upon receipt of the TSM message, but using small steps. When the upstream optical amplifier, e.g., amplifier 150-1, completes its tilt adjustment, it then sends a Tilt Done Message (TDM) in the signaling channel to the next downstream amplifier, amplifier 150-2. When the latter amplifier receives the TDM, then it completes the adjustment using large steps to speed up the process. Similarly, when that amplifier completes its adjustment, it then sends a TDM in the signaling channel to the next downstream amplifier, optical amplifier 150-3, and so on. When the last downstream optical amplifier 150-i+1 receives a TDM, it then completes its adjustments using large steps to speed up the overall system process, all in accordance with the principles of the invention.

As an aspect of the invention, if a downstream optical amplifier does not receive a TSM via the signaling channel within a predetermined period of time of when it detects a change in the power level of the incoming signal or a particular transmission nonlinearity, then the downstream amplifier completes its adjustments using small steps. As another aspect of the invention, the head-end optical amplifier, amplifier 150-1, periodically initiates a tilt adjustment, e.g., once every 15 minutes. When amplifier 150-1 completes its adjustments, it then sends a TDM over the signal channel to the next downstream amplifier 150-2 to advise that amplifier that a tilt adjustment has been completed. Amplifier 150-2, in turn, initiates a tilt adjustment and sends a TDM to the next downstream optical amplifier upon completing the adjustment. Each of the downstream amplifiers, 150-3 through 150-i+1 respond similarly to receipt of a TDM. Note that each of the downstream amplifiers maintains a periodic timer that is set for a period of time slightly longer than 15 minutes, e.g., twenty minutes.

A downstream optical amplifier thus initiates the tilt adjustment in response to receipt of a TDM or the expiration of its periodic timer. Similarly, each of the downstream optical amplifiers 150-2 through 150-i+1 will switch to using a large step adjustment upon receipt of a TDM from the preceding optical amplifier, as mentioned. In accordance with another aspect of the invention, each such optical amplifier will complete an adjustment using small steps if it fails to receive a TDM within a predetermined period of time, e.g., 100 seconds, following the receipt of a TSM. (Note, that in accordance with the principles of the invention, an optical amplifier will continue to perform the adjustment until it receives a TDM or the TDM timer expires even though its output signal has been adjusted to the proper tilt.)

Figure 2:
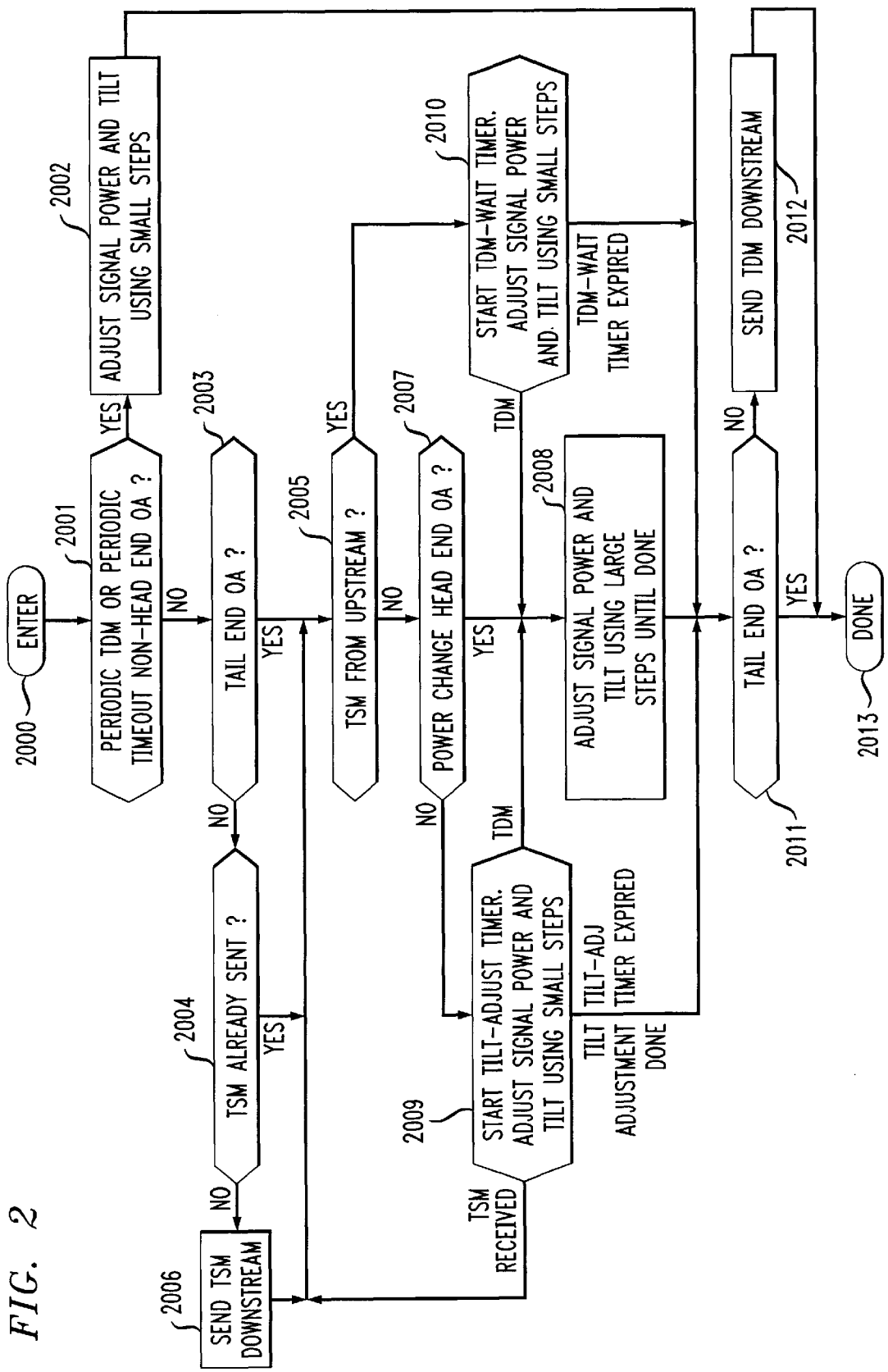
FIG. 2 illustrates in flow chart form a program that implements the principles of the invention in an optical amplifier of FIG. 1.

A flow chart of the system algorithm that is implemented in an optical amplifier is shown in FIG. 2. Specifically, the program of FIG. 2 is entered at block 2000 responsive to receipt of one of a number of stimuli, including, inter alia, (a) the detection of a power change in the incoming signal that exceeds a predetermined threshold, (b) receipt of a TSM or TDM or (c) receipt of a new transmit-channel power map. When entered, the program (block 2001) checks to see if the entry was due to a time out of one of the periodic timers. If that is the case and if the amplifier is a downstream amplifier, then the program (block 2001) initiates the tilt adjustment and pump power adjustment using small steps. When it completes the adjustments, then the program resets the aforementioned timers and exits via the done block 2013 if it is the tail-end amplifier, e.g., amplifier 150-i+1 of FIG. 1. If the entry was due to a power change or some other event and the program determines (block 2003) that it is not the tail-end amplifier, then the determines (block 2004) if it had sent a TSM to the downstream amplifiers. If not, then the program (block 2006) sends a TSM to the downstream amplifiers via the signaling channel, $\lambda_s$. The program (block 2005) then checks to see if it received a TSM from an upstream amplifier. If so, then the program (block 2010) start its TDM wait timer and initiates the tilt adjustment and pump power adjustments using small steps. If it completes its adjustments while in block 2010, then the program proceeds to block 2011 when its TDM-wait timer expires. If the program receives a TDM from the next upstream amplifier, then it proceeds to block 2008 where it completes the aforementioned adjustments using large steps and then proceeds to block 2011. At block 2011 the program proceeds to block 2012 if it is not the tail-end amplifier. Otherwise it resets its various timers and exits via block 2013. At block 2012 the program sends a TDM to the next downstream amplifier and then exits via block 2013.

If the program finds that it is the head-end optical amplifier and a power change occurred, then the program (block 2008) initiates the aforementioned adjustments using large steps. Otherwise, the program (block 2009) starts a tilt-adjustment timer and then initiates the pump power and tilt adjustments using small steps. If the program receives a TDM while in block 2009, then it proceeds to block 2008. Moreover, if the amplifier completes the adjustments before receiving the upstream TDM, then the program proceeds to block 2011 when it has completed the adjustments or when its tilt-adjustment timer expires.

In addition to responding to input power changes and instructions from upstream OAs, an optical amplifier initiates the aforementioned adjustments upon receipt of a new transmit-channel power map from an upstream amplifier. Head-end node 100 (FIG. 1) uses the associations between the OTU ports and OMU ports to determine the relative transmit power levels between optical channels. That is, whether a port is, for example, an OC48 circuit or OC192 circuit. Head-end node 100 performs the association whenever (a) an OTU association changes at an equipped port, (b) an existing OTU association is booted up, or (c) a supervisory data link, i.e., the signaling channel, start-up occurs, e.g., a node reboot, an OA reboot or (d) after a automatic power shut down recovery. Once it determines such associations, then head-end node 100 sends, in the form of a message to the downstream optical amplifiers, a transmit-channel power map identifying the relative transmit power levels between the channels. An optical amplifier, in turn, initiates the aforementioned adjustments upon receipt of the new transmit-channel power map.

FIG. 3 is an illustrative example of such a map in which a '0' indicates that the channel is not equipped; a '1' indicates a low level of transmit power and a '2' indicates a higher level of transmit power. The numbers shown in FIG. 3 are arbitrary selections for the purpose of illustration. The letters are also arbitrary and are illustrative of either a 0, 1 or 2.

Figure 4:
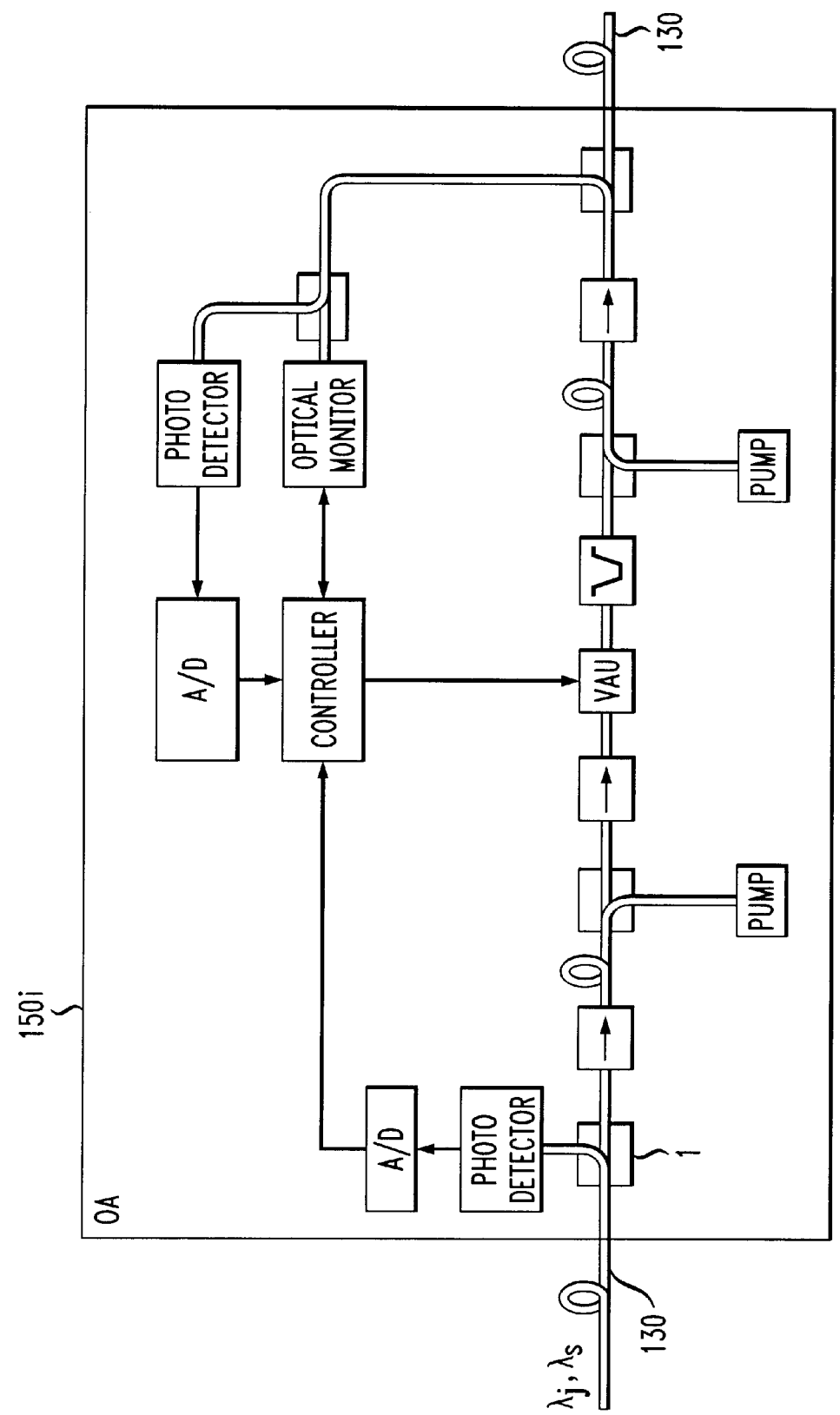
FIG. 4 is a broad block diagram of an optical amplifier having an optical monitor/analyzer.

FIG. 4 (which is FIG. 4 of the above-referenced patent application) is a broad block diagram of an illustrative optical amplifier arranged to perform a tilt adjustment using an "on-board" optical monitor.

Figure 5:
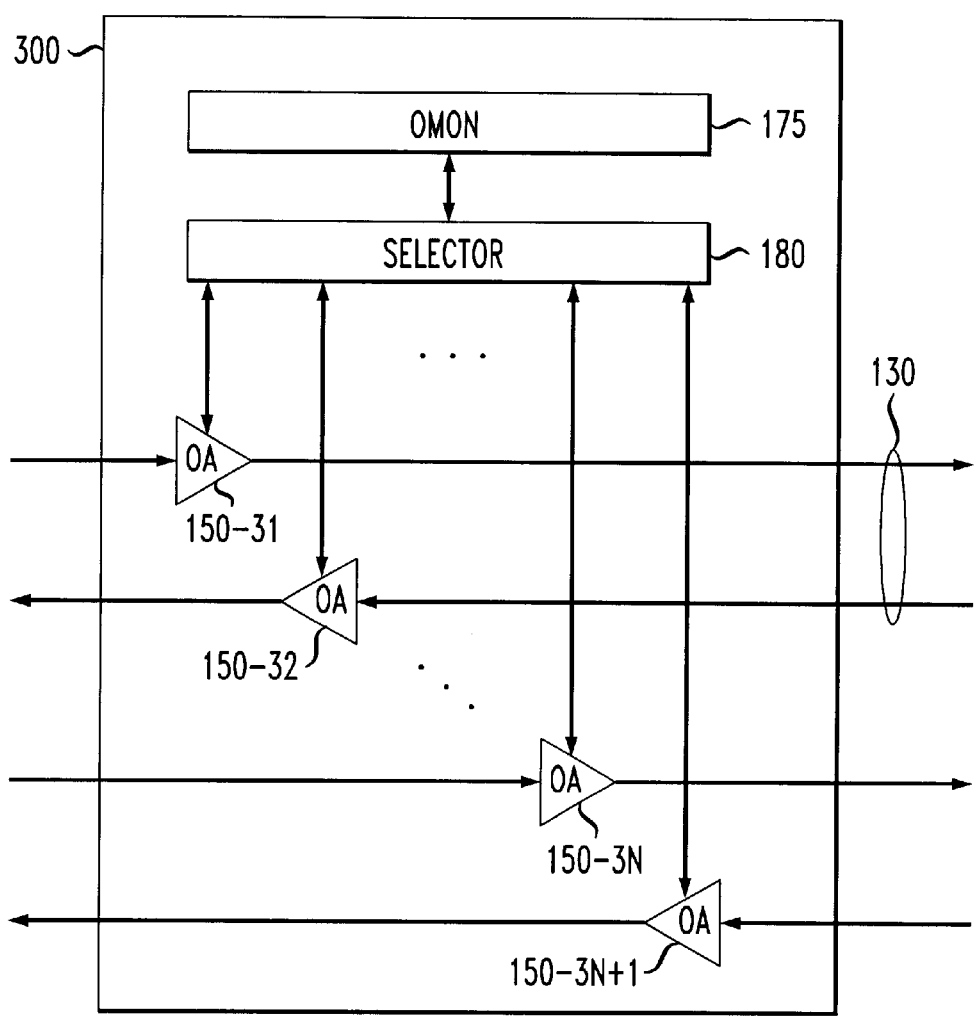
FIG. 5 is an alternative arrangement of using a centralized optical analyzer within an optical node.

In an alternative arrangement, an optical monitor serves a group of optical amplifiers within a node as illustrated in FIG. 5. As shown, selector 180 provides an interface between optical monitor 175 and each of the optical amplifiers 150-31 through 150-3n+1 of the group of amplifiers within a node, e.g., node 100. Selector 180, more particularly, supplies a sample of an optical signal supplied by one of the optical amplifiers to optical monitor 175 in a conventional manner. Optical monitor 175 analyzes the sample and returns the results of its analysis to the optical amplifier, e.g., amplifier 150-31, via selector 180. The optical amplifier then adjusts the tilt of its output signal in accordance with the results. Selector 180 then supplies a sample of an optical signal supplied by another one of the optical amplifiers to optical monitor 175, and so on.

It will thus be appreciated that, although the invention illustrated herein is described in the context of a specific illustrative embodiment, those skilled in the art will be able to devise numerous alternative arrangement which, although, not explicitly shown or described herein, nevertheless, embody the principles of the invention and are within its spirit and scope. For example, a number of different power levels, e.g., three, may be specified for each channel in the transmit-channel power map.

We claim:

1. An optical transmission system comprising
   optical transmission media, and
   a plurality of optical amplifiers disposed along respective points of the optical transmission media, wherein at least one of said optical amplifiers comprises:
      means for starting a particular amplifier adjustment in response to detecting particular stimuli occurring at an input, and
      means for sending an adjustment start message over the optical transmission media to a next downstream amplifier, wherein the particular adjustment includes an adjustment to offest Raman gain and a pump power adjustment.

2. The optical transmission system of claim 1 wherein said adjustment is started using small incremental steps if the amplifier is not a head-end amplifier and completed using large steps when the next upstream amplifier has completed making its adjustment.

3. The optical transmission system of claim 1 wherein the means for starting includes means, responsive adjustment done message to the next downstream amplifier upon completing the adjustment.

4. The optical transmission system of claim 1 wherein the means for starting includes means, responsive to receipt of an adjustment start message, for resending the adjustment start message to the next downstream amplifier and starting the adjustment even though the stimuli was not detected.

5. The optical transmission system of claim 4 wherein the adjustment is started using small incremental steps and, responsive to receipt of an adjustment done message from an upstream amplifier or expiration of a particular timer, completing the adjustment using large steps.

6. The optical transmission system of claim 1 wherein the means for starting includes means for sending an adjustment done message to the next downstream amplifier when the adjustment has been completed.

7. The optical transmission system of claim 1 wherein each said amplifier further comprises
   means, responsive to receipt of the adjustment start message, for starting the adjustment if the stimuli had not been detected and resending the adjustment start message to the next downstream amplifier via the optical transmission media.

8. The optical transmission system of claim 1 wherein said means for starting includes
   means for starting the adjustment using small incremental steps,
   for completing the adjustment using large steps if an adjustment start message is not received from an upstream amplifier and for sending an adjustment done message downstream upon completing the adjustment.

9. The optical transmission system of claim 1 wherein the means for starting includes means for starting the adjustment periodically responsive to the expiration of a periodic timer.

10. The optical transmission system of claim 1 wherein the means for starting includes means for starting the adjustment responsive to receipt of a transmit-channel power map.

11. An optical amplifier configured:
responsive to receipt of a adjustment start message, for adjusting a particular amplifier parameter using small incremental steps and for resending the adjustment start message to a next optical amplifier, and
responsive to receipt of an adjustment done message, for completing the adjustment using large steps, wherein the adjustment includes an adjustment to offset Raman gain and a pump power adjustment.

12. The optical amplifier of claim 11 further configured for completing the adjustment using large steps if the adjustment done message is received within a predetermined period of time of starting the adjustment.

13. The optical amplifier of claim 11 further configured for sending an adjustment done message to a next optical amplifier upon completing the adjustment.

14. The optical amplifier of claim 11 further configured, responsive to an absence of the adjustment start message and responsive to an expiration of a particular periodic timer, for starting the adjustment of the particular amplifier parameter using small incremental steps and completing the adjustment using large steps upon receipt of an adjustment done message or expiration of a particular timer.

15. An optical amplifier configured:
for starting a particular amplifier adjustment in response to detecting particular stimuli occurring at an input and performing the adjustment using small incremental steps,
for sending an adjustment start message over the optical transmission media to a next downstream amplifier, and
for completing the adjustment using large steps if an adjustment start message is not received from another optical amplifier within a predetermined period of time of starting the adjustment, wherein the particular adjustment includes an adjustment to offset Raman gain and a pump power adjustment.

16. The optical amplifier of claim 15 wherein the optical amplifier is one of a plurality of optical amplifiers disposed along an optical transmission path.

17. The optical amplifier of claim 15 further configured for sending an adjustment start message to a next downstream amplifier upon starting the adjustment and for sending and adjustment done message to the downstream amplifier upon completing the adjustment.

18. An optical transmission system comprising
optical transmission media,
a plurality of optical amplifiers disposed along respective points of the optical transmission media, wherein a first one of said optical amplifiers comprises
means for starting a particular amplifier adjustment in response to detecting particular stimuli occurring at an input and performing the adjustment using large steps,
means for sending an adjustment start message over the optical transmission media to a next downstream amplifier, and
means for sending an adjustment done message over the optical transmission media upon completing the adjustment, wherein the particular adjustment includes an adjustment to offset Raman gain and a pump power adjustment.

19. The optical transmission of claim 18 wherein said means for starting includes means for periodically starting said adjustment regardless of the presence of said stimuli.

20. A method of operating an optical amplifier within an optical transmission system having optical transmission media and a plurality of optical amplifiers disposed along respective points of the optical transmission media, said method comprising the steps of:
starting a particular amplifier adjustment in response to detecting particular stimuli occurring at an input and performing the adjustment using large steps,
sending an adjustment start message over the optical transmission media to a next downstream amplifier, and
sending an adjustment done message over the optical transmission media upon completing the adjustment, wherein the particular adjustment includes an adjustment to offset Raman gain and a pump power adjustment.

21. A method of operating an optical amplifier comprising the steps of:
starting a particular amplifier adjustment in response to detecting particular stimuli occurring at an input and performing the adjustment using small incremental steps,
sending an adjustment start message over the optical transmission media to a next downstream amplifier, and
completing the adjustment using large steps if an adjustment start message is not received from another optical amplifier within a predetermined period of time of starting the adjustment, wherein the particular adjustment includes an adjustment to offset Raman gain and a pump power adjustment.

22. An optical amplifier for an optical transmission system having a plurality of such optical amplifiers disposed along respective points of an optical transmission media of the optical transmission system, wherein:
(A) if the optical amplifier is a first optical amplifier along the optical transmission media, then:
(1) when the first optical amplifier detects a particular stimulus occurring at its input, the first optical amplifier (i) initiates a first phase of an amplifier adjustment procedure, wherein the amplifier adjustment procedure involves making adjustments to one or more amplifier characteristics in incremental steps, and (ii) transmits an adjustment start message to a downstream optical amplifier; and
(2) when the first optical amplifier completes the amplifier adjustment procedure, the first optical amplifier transmits an adjustment done message to the downstream optical amplifier;
(B) if the optical amplifier is an intermediate optical amplifier along the optical transmission media, then:
(1) when the intermediate optical amplifier (a) detects a particular stimulus occurring at its input or (b) receives an adjustment start message from an upstream optical amplifier, the intermediate optical amplifier (i) initiates the first phase of the amplifier adjustment procedure and (ii) transmits an adjustment start message to a downstream optical amplifier;
(2) when the intermediate optical amplifier receives an adjustment done message from an upstream optical amplifier before completing the amplifier adjustment procedure, the intermediate optical amplifier initiates a second phase of the amplifier adjustment procedure; and
(3) when the first optical amplifier completes the amplifier adjustment procedure, the first optical amplifier transmits an adjustment done message to the downstream optical amplifier; and (C) if the optical amplifier is a last optical amplifier along the optical transmission media, then:
  (1) when the last optical amplifier (a) detects a particular stimulus occurring at its input or (b) receives an adjustment start message from an upstream optical amplifier, the last optical amplifier initiates the first phase of the amplifier adjustment procedure; and
  (2) when the last optical amplifier receives an adjustment done message from the upstream optical amplifier before completing the amplifier adjustment procedure, the last optical amplifier initiates the second phase of the amplifier adjustment procedure.

23. The optical amplifier of claim 22, wherein the incremental steps of the first phase of the amplifier adjustment procedure are smaller than the incremental steps of the second phase of the amplifier adjustment procedure.

24. The optical amplifier of claim 22, wherein the adjustments to the one or more amplifier characteristics comprises an adjustment to offset Raman gain.

25. The optical amplifier of claim 22, wherein the adjustments to the one or more amplifier characteristics comprises a pump power adjustment.

26. The optical amplifier of claim 22, wherein the adjustments to the one or more amplifier characteristics comprises a tilt adjustment.

27. The optical amplifier of claim 22, wherein the optical amplifier initiates the second phase of the amplifier adjustment procedure before completing the amplifier adjustment procedure after a specified duration of the first phase.

28. The optical amplifier of claim 22, wherein the optical amplifier terminates the amplifier adjustment procedure after a specified duration of the first phase.

29. The optical amplifier of claim 22, wherein, if the optical amplifier is the first optical amplifier or an intermediate optical amplifier, then the optical amplifier transmits the adjustment done message to a downstream optical amplifier after a specified duration of the first phase.

30. The optical amplifier of claim 22, wherein the particular stimulus is a power change in an incoming signal that exceeds a specified threshold.

31. The optical amplifier of claim 22, wherein the particular stimulus is receipt of a new transmit-channel power map.

* * * * *

UNITED STATES PATENT AND TRADEMARK OFFICE
CERTIFICATE OF CORRECTION

PATENT NO.     : 6,313,940 B1
DATED          : November 6, 2001
INVENTOR(S)    : Bode et al.

It is certified that error appears in the above-identified patent and that said Letters Patent is hereby corrected as shown below:

Column 6,
Line 32, replace "means, responsive adjustment" with -- means for sending an adjustment --.

Signed and Sealed this

Twenty-fifth Day of June, 2002

Attest:

Attesting Officer

JAMES E. ROGAN
Director of the United States Patent and Trademark Office